United States Patent
Williamson et al.

(10) Patent No.: US 12,077,656 B2
(45) Date of Patent: Sep. 3, 2024

(54) CELLULOSE ESTER AND ELASTOMER COMPOSITIONS

(71) Applicant: Eastman Chemical Company, Kingsport, TN (US)

(72) Inventors: Brandon Robert Williamson, Johnson City, TN (US); Laura Bauerle Weaver, Johnson City, TN (US); JingJing Xu, Kingsport, TN (US); Michael Eugene Donelson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 719 days.

(21) Appl. No.: 17/261,330

(22) PCT Filed: Jul. 17, 2019

(86) PCT No.: PCT/US2019/042115
§ 371 (c)(1),
(2) Date: Jan. 19, 2021

(87) PCT Pub. No.: WO2020/018614
PCT Pub. Date: Jan. 23, 2020

(65) Prior Publication Data
US 2021/0261759 A1   Aug. 26, 2021

Related U.S. Application Data

(60) Provisional application No. 62/700,464, filed on Jul. 19, 2018.

(51) Int. Cl.
C08L 1/14 (2006.01)
B60R 13/00 (2006.01)
(Continued)

(52) U.S. Cl.
CPC ............. C08L 1/14 (2013.01); B60R 13/00 (2013.01); C08J 3/005 (2013.01); C08J 5/18 (2013.01);
(Continued)

(58) Field of Classification Search
CPC .......... C08L 1/14; C08L 2207/04; C08L 1/10; C08L 9/00; C08L 75/04; C08J 3/005
See application file for complete search history.

(56) References Cited

U.S. PATENT DOCUMENTS 1,683,347 A   9/1928 Gray et al.
1,698,049 A   1/1929 Clarke et al.
(Continued)

FOREIGN PATENT DOCUMENTS

JP   2007161943 A   6/2007
JP   2016124882 A   7/2016
(Continued)

OTHER PUBLICATIONS

ASTM D412 "Standard Test Methods for Vulcanized Rubber and Thermoplastic Elastomers—Tension"; Published Dec. 2016.
(Continued)

Primary Examiner — Ling Siu Choi
Assistant Examiner — Olga Lucia Donahue
(74) Attorney, Agent, or Firm — Robert C. Morriss (57) ABSTRACT

A composition is provided comprising a cellulose ester component that comprises at least one cellulose ester; and an elastomeric component that comprises at least one elastomer, where the elastomeric component comprises 30 wt % or more of the composition, and where the composition is thermoplastic. Processes for producing the compositions as well as articles made using these compositions, such as automotive interior components, are also provided.

18 Claims, 7 Drawing Sheets

Complex viscosity at approximate extrusion temperature for 1:1 SEBS/CAP blend, PVC, and TPU (51) Int. Cl.
  *C08J 3/00* (2006.01)
  *C08J 5/18* (2006.01)
  *C08L 75/04* (2006.01)

(52) U.S. Cl.
  CPC ........... *C08L 75/04* (2013.01); *C08J 2301/14* (2013.01); *C08L 2207/04* (2013.01)

(56) References Cited

U.S. PATENT DOCUMENTS

| | | | |
|---|---|---|---|
| 1,880,560 | A | 10/1932 | Webber et al. |
| 1,880,808 | A | 10/1932 | Clarke et al. |
| 1,984,147 | A | 12/1934 | Malm |
| 2,129,052 | A | 9/1938 | Fordyce |
| 3,617,201 | A | 11/1971 | Berni et al. |
| 3,668,157 | A | 6/1972 | Combs et al. |
| 4,147,603 | A | 4/1979 | Pacifici et al. |
| 4,758,645 | A | 7/1988 | Miyazono et al. |
| 4,839,230 | A | 6/1989 | Cook |
| 4,861,629 | A | 8/1989 | Nahm |
| 5,082,914 | A | 1/1992 | Cook et al. |
| 5,182,379 | A | 1/1993 | Cook et al. |
| 5,292,877 | A | 3/1994 | Edgar et al. |
| 5,384,163 | A | 1/1995 | Budde et al. |
| 5,723,151 | A | 3/1998 | Cook et al. |
| 5,741,901 | A | 4/1998 | Cook et al. |
| 5,750,677 | A | 5/1998 | Edgar et al. |
| 5,981,738 | A | 11/1999 | Cook et al. |
| 6,001,484 | A | 12/1999 | Horrion et al. |
| 6,369,214 | B1 | 4/2002 | Tye et al. |
| 9,068,063 | B2 | 6/2015 | Helmer et al. |
| 2013/0131221 | A1 | 5/2013 | Basu et al. |
| 2013/0150493 | A1 | 6/2013 | Shelby et al. |
| 2019/0359794 | A1* | 11/2019 | An .................... C08L 1/10 |

FOREIGN PATENT DOCUMENTS

| WO | WO 2017/0127603 A1 | 7/2017 |
|---|---|---|
| WO | WO 2018/089573 A1 | 5/2018 |
| WO | WO 2018/089575 A1 | 5/2018 |

OTHER PUBLICATIONS

ASTM D624 "Standard Test Method for Tear Strength of Conventional Vulcanized Rubber and Thermoplastic Elastomers"; Published Feb. 2020.
ASTM D1938 "Standard Test Method for Tear-Propagation Resistance (Trouser Tear) of Plastic Film and Thin Sheeting by a Single-Tear Method"; Published May 2019.
ASTM D2240 "Standard Test Method for Rubber Property—Durometer Hardness"; Published Jan. 2016.
ASTM D3418 "Standard Test Method for Transition Temperatures and Enthalpies of Fusion and Crystallization of Polymers by Differential Scanning Calorimetry" Published Jun. 2015.
ASTM D3985 "Standard Test Method for Oxygen Gas Transmission Rate Through Plastic Film and Sheeting Using a Coulometric Sensor"; Published Dec. 2017.
ASTM D4603 "Standard Test Method for Determining Inherent Viscosity of Poly(Ethylene Terephthalate) (PET) by Glass Capillary Viscometer" Published Jun. 2018.
ASTM F1249 "Standard Test Method for Water Vapor Transmission Rate Through Plastic Film and Sheeting Using a Modulated Infrared Sensor"; Published Jul. 2020.
Shelton, Michael C.; "Cellulose Esters, Organic Esters"; Kirth-Othmer Encyclopedia of Chemical Technology, $5^{th}$ edition, vol. 5, Wiley Interscience, New York (2004), pp. 394-444.
Notification of Transmittal of the International Search Report and the Written Opinion of the International Searching Authority with Date of Mailing Feb. 3, 2020 for International Application No. PCT/US2019/042115.

* cited by examiner

Fig. 1.

Complex viscosity at approximate extrusion temperature for 1:1 SEBS/CAP blend, PVC, and TPU

Fig. 2.

Complex viscosity at 220° of the various SEBS/CAP blends

Complex viscosity of EX4097-10-04 and its components

CELLULOSE ESTER AND ELASTOMER COMPOSITIONS

CROSS-REFERENCE TO RELATED APPLICATION(S)

This application is a national stage filing under 35 USC § 371 of International Application Number PCT/US2019/042115, filed on, Jul. 17, 2019 which claims the benefit of the filing date to U.S. Provisional Application No. 62/700,464, filed on Jul. 19, 2018, the entire disclosures of which are incorporated by reference herein.

FIELD OF THE INVENTION

This invention belongs to the field of soft polymeric materials. The invention also belongs to a field of cellulose ester and elastomer compositions comprising at least one cellulose ester and at least one elastomer. Processes for producing these cellulose ester/elastomer compositions, as well as articles made using these compositions, such as films, extrusions or molded articles are also provided.

BACKGROUND OF THE INVENTION

Soft polymeric materials generally refer to rubbery polymeric materials, or polymer materials with elastic properties or resiliency, that can be used in various applications such as, for example, seals, gaskets, belts, hoses, insulation, molded flexible parts, exterior and interior vehicle applications, and soft feel coverings.

In film and sheet applications in the "soft materials" space, flexible PVC is coming under increased scrutiny for its volatile organic compound (VOC) content (generally due to use of low molecular weight plasticizers) as well as the tendency to generate HCl gas when burned. In addition, the PVC materials are not bio-based. Thermoplastic Polyurethanes (TPUs) are also commonly used for films but have a relatively high cost, can offer poor weatherability, and are coming under increased scrutiny in some regions.

Cellulose esters are a bio-based, sustainable plastic solution that offers a balance of cost and performance for many applications. Although sustainable materials are of interest to many companies for use in their products, few commercial options exist in the soft materials space for a bio-based sustainable material that has acceptable properties for the intended application, such as higher temperature or low VOC requirements.

Cellulose ester compositions typically have a heat deflection temperature (HDT) or glass transition temperature (Tg) of less than 90° C. Commercially available cellulose esters that are melt processed into articles typically contain significant amounts of plasticizer to allow for processing and to impart sufficient toughness to the molded article. However, the addition of plasticizer has drawbacks, as it will decrease the HDT relative to the base cellulose ester and limit the use of the cellulose ester materials for applications that can accommodate an HDT below about 90° C. Also, many traditional plasticizers used for cellulose esters have relatively high volatility and cellulose ester molded articles can experience plasticizer exudation during use.

Traditional plasticization of cellulose esters can prevent the resulting article from achieving the desired properties for many intended applications in the soft material space. For example, plasticizers can reduce the Tg/heat deflection temperature sufficiently such that the material cannot remain dimensionally stable at 120° C. aging and the plasticizer can also provide a level of volatile content that is too high for many applications, for example automotive applications. An extremely high plasticizer content would be needed to reach the desired hardness for many soft material applications, would provide no "elastomeric" behavior (i.e. recovery), and issues with migration or leaching of the plasticizer would be expected.

It would be beneficial to be able to provide melt processable cellulose ester compositions useful in the soft material space that do not have such drawbacks.

BRIEF SUMMARY OF THE INVENTION

Surprisingly, it has been discovered that soft material compositions comprising cellulose esters (or CEs), e.g., cellulose acetate propionate and/or cellulose acetate butyrate, can be prepared with temperature stability up to and exceeding 120° C. In embodiments, the compositions are thermoplastic, have low VOC content, and are suitable for higher temperature soft material applications. In addition to the high temperature stability and low VOC content, such soft material compositions can be prepared to achieve one or more of the following properties: no distinct yield point (that leads to permanent wrinkling/deformation of film); increased breathability (for oxygen and water vapor, compared to PVC); good aesthetics (e.g., low gloss, and no whitening upon bending of film); good haptics (e.g., nice "hand feel", smooth surface with little melt fracture, and low tackiness); low temperature performance (e.g., with no cracking or fracture at −40° C. when tested via a "bent loop" test); wide processing options (e.g., able to be calendared, extruded, and injection molded, as well as amenable to cutting, thermoforming, bonding to substrates, and other secondary processes, depending on the requirements for a certain application); and able to meet target hardness (e.g., 70 to 90 Shore A hardness). In certain embodiments, 2 or more of these properties can be achieved. In certain embodiments, all the properties can be achieved.

The compositions described herein solve unmet material needs by offering a resin blend composition that contains renewable bio-based content, as well as achieving some or all of properties discussed above, depending on the application requirements. In certain embodiments, the compositions described herein are suitable for automotive interior and artificial upholstery applications.

It has been found that the combination of properties (discussed above) cannot be obtained through traditional plasticization of cellulose esters. Plasticizers reduce the Tg/heat deflection temperature such that the material cannot remain dimensionally stable at 120° C. aging and plasticizers also typically provide a level of volatile content that is too high for many applications, for example automotive applications. An extremely high plasticizer content would be needed for the cellulose ester to reach the desired hardness for many soft applications, would provide no "elastomeric" behavior (i.e. recovery), and issues with migration or leaching of the plasticizer would be expected.

It has also been found that the combination of properties (discussed above) cannot be obtained by arbitrarily selecting any elastomer and/or including an elastomer in any amount for blending with cellulose esters. It has been found that a composition comprising at least one cellulose ester component and at least one elastomeric component can be prepared to achieve the desired properties discussed above.

In certain embodiments, the invention relates to a composition that comprises a blend of a cellulose ester component that comprises at least one cellulose ester (CE) and an elastomeric component that comprises at least one elastomer, wherein the elastomeric component is present in an amount from 30 to 80, or 40 to 80 weight percent, based on the total composition, and wherein the composition is thermoplastic. In embodiments, the composition is thermoplastic and melt-processible over a temperature range from the melting point temperature up to the degradation temperature. In embodiments, the composition is thermoplastic and melt-processible over a temperature range from about 175° C. up to the degradation temperature. In embodiments, the composition is thermoplastic and melt-processible at a temperature in the range from about 175° C., or 180° C., or 190° C., or 200° C., or 210° C., or 220° C. up to the degradation temperature, or from 175° C. to about 300° C., or from 200° C. to 250° C., or from 220° C. to 240° C. In embodiments, the composition has a volatile content of 2 wt % or less, or 1 wt % or less.

In certain embodiments, the composition is multi-phased. In embodiments, the elastomeric component is a continuous phase and the cellulose ester component is a dispersed phase. In embodiments, the elastomeric component and the cellulose ester component are miscible.

In certain embodiments, the cellulose ester can be a cellulose ester containing ester functionality of a type chosen from: acetate, propionate, butyrate, or any combination thereof. In embodiments, the cellulose ester is chosen from cellulose propionate (CP), cellulose butyrate (CB), cellulose acetate propionate (CAP), cellulose acetate butyrate (CAB), cellulose propionate butyrate (CPB), cellulose tripropionate (CTP), cellulose tributyrate (CTB), or a combination thereof. In certain embodiments, the cellulose ester component can be comprised of a blend of two or more of the different cellulose esters, e.g., different ester functionality or cellulose esters of the same type (functionality) with different molecular weights.

In certain embodiments, the elastomeric component comprises at least one elastomer of a type chosen from: natural rubber, polyisoprene, polybutadiene, chloroprene, butyl rubber, styrene-butadiene rubber (SBR), nitrile rubber, ethylene-propylene rubber (EPR), ethylene-propylene-diene rubber (EPDM), epichlorohydrin rubber, polyacrylic rubber, silicone rubber, fluorinated rubbers and elastomers, polyether block amides (PEBA), ethylene-vinyl acetate (EVA), styrenic block copolymer elastomers (such as SEBS, SEPS, SBS, or SIS), thermoplastic polyolefin elastomers (TPO), thermoplastic vulcanizates (TPV), thermoplastic polyurethanes (TPU), thermoplastic copolyester elastomers (TPC), other thermoplastic polyamide elastomers (TPA), or a combination of 2 or more of these types. In embodiments, the elastomer may be chemically modified (i.e. functionalized) rubbers/elastomers. In embodiments, the functionalized elastomer can be chosen from maleic anhydride-grafted elastomers, acrylic copolymers, block copolymers, or combinations thereof. In embodiments, the elastomeric component can comprise a combination of two or more of the above elastomers. In certain embodiments, the elastomeric component comprises a combination of non-functionalized and functionalized elastomers.

In embodiments, the elastomeric component comprises thermoplastic elastomers. In embodiments, the thermoplastic elastomers are chosen from: polyether block amides (PEBA), ethylene-vinyl acetate (EVA), styrenic block copolymer elastomers (such as SEBS, SEPS, SBS, or SIS), thermoplastic polyolefin elastomers (TPO), thermoplastic vulcanizates (TPV), thermoplastic polyurethanes (TPU), thermoplastic copolyester elastomers (TPC), other thermoplastic polyamide elastomers (TPA), or a combination thereof.

In embodiments, the composition comprises a blend of: (a) a cellulose ester component that comprises at least one cellulose ester; and (b) an elastomeric component that comprises an elastomer chosen from an SEBS elastomer, a maleic anhydride modified SEBS elastomer, or a combination thereof, wherein the elastomeric component is present in an amount from 40 to 80 weight percent. In one embodiment, the elastomeric component is present in an amount from 50 to 80 weight percent. In one embodiment, the cellulose ester is CAP.

In embodiments, the composition comprises a blend of a cellulose ester component that comprises at least one cellulose ester; and an elastomeric component that comprises at least one elastomer, wherein the elastomeric component is present in an amount from 60 to 99 weight percent, based on the total composition, wherein the elastomeric component and cellulose ester component are miscible, and wherein the composition is thermoplastic. In an embodiment, wherein the elastomeric component and cellulose ester component are miscible, the elastomeric component comprises a TPU elastomer.

In embodiments, a process for producing the elastomeric composition is provided comprising contacting at least one cellulose ester, and at least one elastomer, and mixing the combination. In embodiments, the elastomer is present in an amount that substantially maintains the desired temperature stability and/or bio-content. In embodiments, the elastomer is present in an amount that provides good tear strength, sufficient stretch-set properties, and a desired hardness. In an embodiment, the elastomer is present in an amount that provides a sufficient soft-touch (or soft-feel) and hardness for the desired soft material application, such as a vehicle interior application.

In embodiments of the invention, compositions are described that are substantially free of plasticizer, or if plasticizer is present it is an amount such that the volatile content is less than 2 wt %. In embodiments, the composition contains no intentionally added plasticizer or no plasticizer.

In another embodiment of the invention, elastomeric compositions are provided that contain no plasticizer, but are melt processable and result in a molded article having a hardness in the range from 60 to 95 Shore A, or 65 to 90 Shore A, or 70 to 90 Shore A, or 65 to 85 Shore A.

In certain embodiments, the elastomeric compositions described above, can contain up to 20 wt % of additional additives chosen from process aids, compatibilizers, fillers, stabilizers, adhesion promoters, performance modifiers, or combinations thereof.

In certain embodiments, the cellulose ester is a resin chosen from at least one cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tripropionate (CTP), or cellulose tributyrate (CTB).

BRIEF DESCRIPTION OF THE DRAWINGS

FIG. 3(a-c) are graphs of complex viscosity as a function of frequency for various elastomer/CAP blends compared to their respective components.

FIGS. 4(a-c) are photomicrographs of various elastomer/CAP blend films.

DETAILED DESCRIPTION

In one embodiment of the invention, a composition is provided comprising at least one cellulose ester and at least one elastomer, wherein the elastomer is present in an amount from 30 to 99, or 30 to 80, or 40 to 80, or 60 to 99 weight percent, based on the total composition, and wherein the composition is thermoplastic. In embodiments, the composition is multi-phased and the elastomer is present in an amount from 30 to 80, or 40 to 80 weight percent, based on the total composition. In embodiments, the composition is substantially miscible, i.e., the cellulose esters and elastomers are miscible, and the elastomer is present in an amount from 60 to 99, or 60 to 90 weight percent, based on the total composition.

By thermoplastic is meant that after blending or compounding the composition, the composition becomes plastic on heating and hardens on cooling, and these processes can be repeated. The thermoplastic composition becomes pliable or moldable above a specific temperature, e.g., a temperature in the range from the melting point temperature up the degradation temperature, and solidifies upon cooling below a solidification temperature. The process of melting and solidifying can be repeated without any substantial degradation or crosslinking of the composition, e.g., where it thermosets such that it cannot be re-melted without significant degradation. It should be understood that components of the thermoplastic blend (or composition) can already be thermoset or cross-linked, e.g., elastomers that are lightly cross-linked, as long as the overall composition retains its thermoplastic behavior.

In embodiments, the cellulose ester utilized in this invention can be any cellulose ester having a sufficient content of salt or ester moieties of $C_3$ to $C_{10}$ acids, preferably propionate and/or butyrate moieties. Cellulose esters that can be used for the present invention generally comprise repeating units of the structure:

wherein $R^1$, $R^2$, and $R^3$ are selected independently from the group consisting of hydrogen or straight chain alkanoyl having from 2 to 10 carbon atoms. For cellulose esters, the substitution level is usually expressed in terms of degree of substitution (DS), which is the average number of non-OH substituents per anhydroglucose unit (AGU). Generally, conventional cellulose contains three hydroxyl groups in each AGU unit that can be substituted; therefore, DS can have a value between zero and three. However, low molecular weight cellulose mixed esters can have a total degree of substitution slightly above 3 due to end group contributions. Native cellulose is a large polysaccharide with a degree of polymerization from 250-5,000 even after pulping and purification, and thus the assumption that the maximum DS is 3.0 is approximately correct. However, as the degree of polymerization is lowered, as in low molecular weight cellulose mixed esters, the end groups of the polysaccharide backbone become relatively more significant, thereby resulting in a DS that can range in excess of 3.0. Low molecular weight cellulose mixed esters are discussed in more detail subsequently in this disclosure. Because DS is a statistical mean value, a value of 1 does not assure that every AGU has a single substitutent. In some cases, there can be unsubstituted anhydroglucose units, some with two and some with three substitutents, and typically the value will be a non-integer. Total DS is defined as the average number of all of substituents per anhydroglucose unit. The degree of substitution per AGU can also refer to a particular substitutent, such as, for example, hydroxyl, acetyl, butyryl, or propionyl.

In embodiments, the cellulose ester utilized can be a cellulose triester or a secondary cellulose ester. Examples of cellulose triesters include, but are not limited to, cellulose tripropionate or cellulose tributyrate. Examples of secondary cellulose esters include cellulose acetate propionate and cellulose acetate butyrate.

In one embodiment of the invention, the cellulose ester can be chosen from cellulose propionate (CP), cellulose butyrate (CB), cellulose acetate propionate (CAP), cellulose acetate butyrate (CAB), cellulose propionate butyrate (CPB), cellulose acetate isobutyrate (CAIB), cellulose tripropionate (CTP), or cellulose tributyrate (CTB) and the like, or combinations thereof. Examples of some cellulose esters are described in U.S. Pat. Nos. 1,698,049; 1,683,347; 1,880,808; 1,880,560; 1,984,147, 2,129,052; and 3,617,201, incorporated herein by reference in their entirety to the extent that they do not contradict the statements herein. In one embodiment, the cellulose ester is CAP.

In one embodiment of the invention, the cellulose ester can be chosen from cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tripropionate (CTP), or cellulose tributyrate (CTB), but not from cellulose acetate (CA).

In embodiments, the cellulose esters can have a relative viscosity ($\eta_{rel}$) of greater than 6.0 to about 9.0, or about 6.1 to about 8.5, as measured at a temperature of 25° C. for a 2 wt % solution of the cellulose ester in acetone. Relative viscosity is the ratio of the efflux time of polymer solution to the solvent in which the polymer is dissolved. Relative viscosity in accordance with this disclosure can be determined as follows: a capillary type viscometer (CANNON miniPV-HX) is employed to measure the relative viscosity of a sample following ASTM D4603. In embodiments, the cellulose esters can have a relative viscosity ($\eta_{rel}$) from about 2.5 to 6.0, or 2.5 to 6.0, or 2.6 to 6.0, as measured at a temperature of 25° C. for a 2 wt % solution of the cellulose ester in acetone. In embodiments, the cellulose esters can have a relative viscosity ($\eta_{rel}$) from about 2.5 or less, or about 1.0 to about 2.5, or 1.0 to 2.5, as measured at a temperature of 25° C. for a 2 wt % solution of the cellulose ester in acetone. Examples of cellulose esters include, but are not limited to, cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tripropionate (CTP), or cellulose tributyrate (CTB), and the like.

In certain embodiments of the invention, the cellulose ester has a total percentage of propionyl by weight in the range from 15 to 52%, or 20 to 52%, or 25 to 52%, or 30 to 52%, or 35 to 52%, or 40 to 52%, or 45 to 52%, or 49 to 52%, or 15 to 50%, or 20 to 50%, or 25 to 50%, or 30 to 50%, or 35 to 50%, or 40 to 50%, or 45 to 50%, 15 to less than 50%, or 20 to less than 50%, or 25 to less than 50%, or 30 to less than 50%, or 35 to less than 50%, or 40 to less than 50%, or 45 to less than 50%, or 35 to less than 50%, or 40 to less than 50%, or 45 to less than 50%, or 15 to 38%, or 20 to 38%, or 25 to 38%, or 30 to 38%, or 35 to 38%, or 15 to 35%, or 20 to 35%, or 25 to 35%, or 30 to 35%, or 15 to 30%, or 20 to 30%, or 25 to 30%, based on the total weight of the cellulose ester polymer.

In certain embodiments of the invention, the cellulose ester has a total percentage of butyryl by weight in the range from 15 to 57%, or 20 to 57%, or 25 to 57%, or 30 to 57%, or 35 to 57%, or 40 to 57%, or greater than 40 to 57%, or 41 to 57%, or 45 to 57%, or 50 to 57%, or 15 to 55%, or 20 to 55%, or 25 to 55%, or 30 to 55%, or 35 to 55%, or 40 to 55%, or greater than 40 to 55%, or 41 to 55%, or 45 to 55%, or 50 to 55%, 15 to 50%, or 20 to 50%, or 25 to 50%, or 30 to 50%, or 35 to 50%, or 40 to 50%, or greater than 40 to 50%, or 41 to 50%, or 45 to 50%, or 15 to 45%, or 20 to 45%, or 25 to 45%, or 30 to 45%, or 35 to 45%, or 40 to 45%, or greater than 40 to 45%, or 41 to 45%, or 15 to 35%, or 20 to 35%, or 25 to 35%, or 30 to 35%, or 15 to less than 32%, or 20 to less than 32%, or 25 to less than 32%, or 15 to 30%, or 20 to 30%, or 25 to 30%, based on the total weight of the cellulose ester polymer.

In certain embodiments, the cellulose ester is cellulose propionate butyrate or cellulose acetate propionate butyrate, with the combined propionate and butyryl content as a percentage of total weight of the polymer in the range from 15% to 55%, or 15% to 50%, or 15% to 45%, or 15% to 40%, or 15% to 35%, or 15% to 30%, or 15% to 25%, or 15% to 20%, or 20% to 55%, or 20% to 50%, or 20% to 45%, or 20% to 40%, or 20% to 35%, or 20% to 30%, or 20% to 25%, or 25% to 55%, or 25% to 50%, or 25% to 45%, or 25% to 40%, or 25% to 35%, or 25% to 30%, or 30% to 55%, or 30% to 50%, or 30% to 45%, or 30% to 40%, or 30% to 35%, or 35% to 55%, or 35% to 50%, or 35% to 45%, or 35% to 40%, 40% to 55%, or 40% to 50%, or 40% to 45%, or 40% to 55%, or 40% to 55%, or 40% to 55%, or 40% to 45%, or 45% to 55%, or 45% to 50%, or 50% to 55%.

Cellulose esters can be produced by any method known in the art. Examples of processes for producing cellulose esters are taught in Kirk-Othmer, Encyclopedia of Chemical Technology, 5$^{th}$ Edition, Vol. 5, Wiley-Interscience, New York (2004), pp. 394-444. Cellulose, the starting material for producing cellulose esters, can be obtained in different grades and sources such as from cotton linters, softwood pulp, hardwood pulp, corn fiber and other agricultural sources, and bacterial cellulose, among others.

One method of producing cellulose esters is esterification of the cellulose by mixing cellulose with the appropriate organic acids, acid anhydrides, and catalysts. Cellulose is then converted to a cellulose triester. Ester hydrolysis is then performed by adding a water-acid mixture to the cellulose triester, which can then be filtered to remove any gel particles or fibers. Water is then added to the mixture to precipitate the cellulose ester. The cellulose ester can then be washed with water to remove reaction by-products followed by dewatering and drying.

The cellulose triesters to be hydrolyzed can have three substitutents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate, and cellulose acetate butyrate. These cellulose esters can be prepared by a number of methods known to those skilled in the art. For example, cellulose esters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

After esterification of the cellulose to the triester, part of the acyl substitutents can be removed by hydrolysis or by alcoholysis to give a secondary cellulose ester. As noted previously, depending on the particular method employed, the distribution of the acyl substituents can be random or non-random. Secondary cellulose esters can also be prepared directly with no hydrolysis by using a limiting amount of acylating reagent. This process is particularly useful when the reaction is conducted in a solvent that will dissolve cellulose. All of these methods can be used to yield cellulose esters that are useful in this invention.

The most common commercial secondary cellulose esters are prepared by initial acid catalyzed heterogeneous acylation of cellulose to form the cellulose triester. After a homogeneous solution in the corresponding carboxylic acid of the cellulose triester is obtained, the cellulose triester is then subjected to hydrolysis until the desired degree of substitution is obtained. After isolation, a random secondary cellulose ester is obtained. That is, the relative degree of substitution (RDS) at each hydroxyl is roughly equal.

Some examples of cellulose esters useful in the present invention can be prepared using techniques known in the art and can be obtained from Eastman Chemical Company, Kingsport, TN, U.S.A., e.g., Eastman™ Cellulose Acetate Propionate CAP 482-20, Eastman™ Cellulose Acetate Propionate CAP 141-20, Eastman™ Cellulose Acetate Butyrate CAB 381-20, and Cellulose Acetate Butyrate CAB 171-15. Examples of some common cellulose esters, with relative viscosity values shown, are listed below in Table 1. In certain embodiments, common cellulose esters having a relative viscosity greater than 6.0 (as shown in Table 1) can be utilized in the present invention. In certain embodiments, common cellulose esters having a relative viscosity from 2.5 to 6.0 (as shown in Table 1) can be utilized in the present invention. In certain embodiments, common cellulose esters having a relative viscosity from 1.0 to 2.5 (as shown in Table 1) can be utilized in the present invention. In certain other embodiments, combinations of different common cellulose esters having different relative viscosities, e.g., respectively greater than 6.0 and less than 6.0 (as shown in Table 1), can be utilized.

TABLE 1

Common Cellulose Esters

| CE Grade | CE Material* | Relative Viscosity | Acetyl Wt % | propionyl Wt % | butyryl Wt % |
|---|---|---|---|---|---|
| 1 | CAP 482-20 | 7.40 | 1.3 | 48 | 0 |
| 2 | CP520-7(CTP) | 4.6 | 0 | 50 | 0 |
| 3 | CAB 381-20 | 8.47 | 13.5 | 0 | 37 |
| 4 | CAP 141-20 | 7.07 | 29.1 | 14.7 | 0 |
| 5 | CAB 500-5 | 5 | 2 | 0 | 47 |
| 6 | CAP 482-3 | 4.26 | 2 | 47 | 0 |
| 7 | CAP 202-29 | 8.04 | 24.48 | 18.07 | 0 |

TABLE 1-continued

Common Cellulose Esters

| CE Grade | CE Material* | Relative Viscosity | Acetyl Wt % | propionyl Wt % | butyryl Wt % |
|---|---|---|---|---|---|
| 8 | CA 398-3 | 3.89 | 39.8 | 0 | 0 |
| 9 | CAB381-0.1 | 1.8 | 13.5 | 0 | 38 |
| 10 | CAP 482-0.5 | 2.50 | 2.5 | 45 | 0 |

*CE Materials Manufactured by Eastman Chemical Company

In embodiments, the cellulose esters utilized in this invention can also contain chemical functionality and are described herein as either derivatized, modified, or functionalized cellulose esters. Functionalized cellulose esters can be produced by reacting the free hydroxyl groups of cellulose esters with a bifunctional reactant that has one linking group for grafting to the cellulose ester and one functional group to provide a new chemical group to the cellulose ester. Examples of such bifunctional reactants include succinic anhydride which links through an ester bond and provides acid functionality; mercaptosilanes which links through alkoxysilane bonds and provides mercapto functionality; and isocyanotoethyl methacrylate which links through a urethane bond and gives methacrylate functionality.

In one embodiment of the invention, functionalized cellulose esters are produced by reacting the free hydroxyl groups of the cellulose esters with a bifunctional reactant producing a cellulose ester with at least one functional group selected from the group consisting of unsaturation (double bonds), carboxylic acids, acetoacetate, acetoacetate imide, mercapto, melamine, and long alkyl chains.

Bifunctional reactants to produce cellulose esters containing unsaturation (double bonds) functionality are described in U.S. Pat. Nos. 4,839,230, 5,741,901, 5,871,573, 5,981,738, 4,147,603, 4,758,645, and 4,861,629; all of which are incorporated by reference to the extent they do not contradict the statements herein. In one embodiment, the cellulose esters containing unsaturation is produced by reacting a cellulose ester containing residual hydroxyl groups with an acrylic based compound and m-isopropyenyl-α,α'-dimethylbenzyl isocyanate. The grafted cellulose ester is a urethane-containing product having pendant (meth)acrylate and α-methylstyrene moieties. In another embodiment, the cellulose esters containing unsaturation is produced by reacting maleic anhydride and a cellulose ester in the presence of an alkaline earth metal or ammonium salt of a lower alkyl monocarboxylic acid catalyst, and at least one saturated monocarboxylic acid have 2 to 4 carbon atoms. In another embodiment, the cellulose esters containing unsaturation is produced from the reaction product of (a) at least one cellulosic polymer having isocyanate reactive hydroxyl functionality, and (b) at least one hydroxyl reactive poly(alpha,beta ethyleneically unsaturated) isocyanate.

Bifunctional reactants to produce cellulose esters containing carboxylic acid functionality are described in U.S. Pat. Nos. 5,384,163, 5,723,151, and 4,758,645; all of which are incorporated by reference to the extent they do not contradict the statements herein. In one embodiment, the cellulose esters containing carboxylic acid functionality is produced by reacting a cellulose ester and a mono- or di-ester of maleic or furmaric acid, thereby obtaining a cellulose derivative having double bond functionality. In another embodiment, the cellulose esters containing carboxylic acid functionality has a first and second residue, wherein the first residue is a residue of a cyclic dicarboxylic acid anhydride and the second residue is a residue of an oleophilic monocarboxylic acid and/or a residue of a hydrophilic monocarboxylic acid. In yet another embodiment, the cellulose esters containing carboxylic acid functionality are cellulose acetate phthalates, which can be prepared by reacting cellulose acetate with phthalic anhydride.

Bifunctional reactants to produce cellulose esters containing acetoacetate functionality are described in U.S. Pat. No. 5,292,877; which is incorporated by reference to the extent it does not contradict the statements herein. In one embodiment, the cellulose esters containing acetoacetate functionality are produced by contacting: (i) cellulose; (ii) diketene, an alkyl acetoacetate, 2,2,6, trimethyl-4H 1,3-dioxin-4-one, or a mixture thereof, and (iii) a solubilizing amount of solvent system comprising lithium chloride plus a carboxamide selected from the group consisting of 1-methyl-2-pyrolidinone, N,N dimethylacetamide, or a mixture thereof.

Bifunctional reactants to produce cellulose esters containing acetoacetate imide functionality are described in U.S. Pat. No. 6,369,214 which is incorporated by reference to the extent it does not contradict the statements herein. Cellulose esters containing acetoacetate imide functionality are the reaction product of a cellulose ester and at least one acetoacetyl group and an amine functional compound comprising at least one primary amine.

Bifunctional reactants to produce cellulose esters containing mercapto functionality are described in U.S. Pat. No. 5,082,914; which is incorporated by reference to the extent it does not contradict the statements herein. In one embodiment of the invention, the cellulose ester is grafted with a silicon-containing thiol component which is either commercially available or can be prepared by procedures known in the art. Examples of silicon-containing thiol compounds include, but are not limited to, (3-mercaptopropyl)trimethoxysilane, (3-mercaptopropyl)-dimethyl-methoxysilane, (3-mercaptopropyl)dimethoxymethylsilane, (3-mercaptopropyl)dimethylchlorosilane, (3-mercaptopropyl)dimethylethoxysilane, (3-mercaptopropyl)diethyoxymethylsilane, and (3-mercapto-propyl)triethoxysilane.

Bifunctional reactants to produce cellulose esters containing melamine functionality are described in U.S. Pat. No. 5,182,379; which is incorporated by reference to the extent it does not contradict the statements herein. In one embodiment, the cellulose esters containing melamine functionality are prepared by reacting a cellulose ester with a melamine compound to form a grafted cellulose ester having melamine moieties grafted to the backbone of the anhydrogluclose rings of the cellulose ester. In one embodiment, the melamine compound is selected from the group consisting of methylol ethers of melamine and aminoplast resins.

Bifunctional reactants to produce cellulose esters containing long alkyl chain functionality are described in U.S. Pat. No. 5,750,677; which is incorporated by reference to the extent it does not contradict the statements herein. In one embodiment, the cellulose esters containing long alkyl chain functionality is produced by reaction of cellulose in a carboxamide diluents or a urea-based diluent with an acylating reagent using a titanium-containing specifies. Cellulose esters containing long alkyl chain functionality can be selected from the group consisting of cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

In certain embodiments, the cellulose ester is cellulose acetate propionate (CAP) having a propionyl content in the range from 15% to 52%, or 15% to 45%, or 15% to 38%, or 15% to 35%, or 15% to 30%, or 15% to 25%, or 20% to 52%, or 20% to 45%, or 20% to 38%, or 20% to 35%, or 20% to 30%, or 25% to 52%, or 25% to 45%, or 25% to 38%, or 25% to 35%, or 30% to 52%, or 30% to 45%, or 30% to 38%, or 35% to 52%, or 35% to 45%, or 35% to 38%, or 38% to 49%, or 49% to 52%.

In certain embodiments, the cellulose ester is cellulose acetate butyrate (CAB) having a butyryl content as a percentage of total weight of the polymer in the range from or 10% to 57%, or 10% to 50% or 10% to 45%, or 10% to 40%, or 10% to 32%, or 10% to 25%, or 10% to 18%, or 15% to 57%, or 15% to 50% or 15% to 45%, or 15% to 40%, or 15% to 32%, or 15% to 25%, or 15% to 18%, or 20% to 57%, or 20% to 50% or 20% to 45%, or 20% to 40%, or 20% to 32%, or 20% to 25%, or 25% to 57%, or 25% to 50%, or 25% to 45%, or 25% to 40%, or 25% to 32%, or 30% to 57%, or 30% to 50%, or 30% to 45%, or 35% to 57% or 35% to 50%, or 35% to 40%, or 40% to 57% or 40% to 50%, or 40% to 45%, or 45% to 57% or 45% to 50%.

In certain embodiments, the cellulose ester is cellulose propionate butyrate, or cellulose acetate propionate butyrate, with the combined propionyl and butyryl content as a percentage of total weight of the polymer in the range from 15% to 55%, or 15% to 50%, or 15% to 45%, or 15% to 40%, or 15% to 35%, or 15% to 30%, or 15% to 25%, or 15% to 20%, or 20% to 55%, or 20% to 50%, or 20% to 45%, or 20% to 40%, or 20% to 35%, or 20% to 30%, or 20% to 25%, or 25% to 55%, or 25% to 50%, or 25% to 45%, or 25% to 40%, or 25% to 35%, or 25% to 30%, or 30% to 55%, or 30% to 50%, or 30% to 45%, or 30% to 40%, or 30% to 35%, or 35% to 55%, or 35% to 50%, or 35% to 45%, or 35% to 40%, 40% to 55%, or 40% to 50%, or 40% to 45%, or 40% to 55%, or 40% to 55%, or 40% to 55%, or 40% to 45%, or 45% to 55%, or 45% to 50%, or 50% to 55%.

In embodiments of the invention, the elastomeric component can be chosen from one or more of the following types: natural rubber, polyisoprene, polybutadiene, chloroprene, butyl rubber, styrene-butadiene rubber (SBR), nitrile rubber, ethylene-propylene rubber (EPR), ethylene-propylene-diene rubber (EPDM), epichlorohydrin rubber, polyacrylic rubber, silicone rubber, fluorinated rubbers and elastomers, polyether block amides (PEBA), ethylene-vinyl acetate (EVA), styrenic block copolymer elastomers (such as SEBS, SEPS, SBS, or SIS), thermoplastic polyolefin elastomers (TPO), thermoplastic vulcanizates (TPV), thermoplastic polyurethanes (TPU), thermoplastic copolyester elastomers (TPC), or other thermoplastic polyamide elastomer (TPA). In certain embodiments, chemically modified (i.e. functionalized) rubbers/elastomers may also be used. Some examples of chemically modified elastomers are maleic anhydride-grafted elastomers, acrylic copolymers, or block copolymers. The elastomeric component may be a combination of two or more of the above elastomers. In certain embodiments, a combination of non-functionalized and functionalized elastomers may be used.

In embodiments, the elastomeric component comprises a thermoplastic elastomer. In embodiments, the elastomeric component consists of one or more thermoplastic elastomers. In embodiments, the elastomeric component comprises one or more thermoplastic elastomers and one or more pre-crosslinked elastomers, and wherein the composition is thermoplastic.

In embodiments, the elastomer has a hardness in the range from 10 to 60 Shore A, or greater than 10 to less than 60 Shore A. In embodiments, the elastomer has a hardness in the range from 60 to 90 Shore A, or greater than 60 to less than 90 Shore A. In embodiments, the elastomer has a hardness in the range from 10 to 100 Shore OO, or greater than 10 to less than 100 Shore OO.

In embodiments, a composition is provided that comprises a blend of at least one cellulose ester component and one elastomeric component, in which the elastomeric component is present in a range from 30 to 80%, or 40 to 80%, or 50 to 80%, or greater than 50 to 80%, by weight, based on the total composition. In embodiments, a composition is provided that comprises a blend of at least one cellulose ester component and one elastomeric component, in which the elastomeric component is present in a range from 60 to 99%, or 60 to 95%, or 60 to 90%, or greater than 60 to 90%, by weight, based on the total composition.

In an embodiment, the composition has a bio-based/renewable content in the range from 10% to 50%, or 10 to 45%, or 10 to 40% by weight. In another embodiment, the composition has a bio-based/renewable content in the range from 40 to 90%, or 50% to 90% by weight.

In embodiments, the composition has at least one glass transition temperature (Tg) or melting point temperature (Tm) of at least 120° C., or at least 130° C., or at least 140° C., or at least 150° C., or at least 160° C., or at least 170° C., or at least 180° C., or at least 190° C., or at least 200° C., as measured by DSC. Tg can be measured for example according to ASTM D3418 using a TA 2100 Thermal Analyst Instrument using a scan rate of 10° C./min.

In embodiments, the composition has a volatile content less than 3, or less than 2.5, or less than 2, or less than 1.5, or less than 1.0, or less than 0.5, or less than 0.25, less than 0.2, or less than 0.1 wt % when held at 200° C. for 10 minutes after drying at 70 C for 4 hours in a dessiccant bed dryer. In an embodiment, the composition has a VOC content less than 1000, or less than 750, or less than 500, or less than 250 ppm and a FOG value less than 2500, or less than 2000, or less than 1500, or less than 1000, or less than 600, or less than 500 ppm measured using the VDA 278 test for volatile organic content.

In embodiments, the composition has a ductile to brittle transition temperature of −20° C., or −30° C., or −40° C., or −50° C. or less and/or passes the bent loop test at −60° C. as described herein.

In embodiments, the composition has a surface energy of 30, or 35, or 40, or 45, or higher dynes/cm.

In embodiments, the composition exhibits an oxygen permeability of 10,000, or 20,000, or 30,000, or higher cc*mil/(m²*24 h), as measure by the method described herein.

In embodiments, no tensile yield behavior is observed for the composition, i.e., has a zero or positive slope on the stress vs. strain curve. Yield behavior is considered to occur when the slope of the engineering stress-strain curve, as measured by the tensile testing method described herein, is zero or less. Yield refers to a rapid change in slope of the engineering stress-strain curve, determined by the derivative of the slope curve having a value more negative than −0.5 MPa.

In certain embodiments, the final properties of the composition can be tailored for a specific application. For example, certain applications may require a softer or harder final product, or a specific viscosity for processing concerns. Other applications may need specific additives to promote adhesion, weatherability, increased temperature stability, or one of many other application-specific needs.

In embodiments, the invention is directed to an extruded article made from any of the compositions discussed herein. In embodiments, the extruded article can be chosen from films or profile extrusions. In certain embodiments, the invention is directed to a calendared article made from any of the compositions discussed herein. In certain embodiments, the invention is directed to an injection molded article made from any of the compositions discussed herein.

In certain embodiments, the composition can be used for extruded films for automotive interiors and/or artificial leather upholstery. In certain embodiments for such applications, the composition comprises a blend of a cellulose acetate propionate or cellulose acetate butyrate with a low hardness elastomer. In one embodiment, the elastomer is an SEBS elastomer. In certain embodiments, the elastomer has a hardness less than 60 Shore A, contains no oil extenders, and contains no volatile low molecular weight plasticizers. In embodiments, the elastomer may contain a grafted or copolymerized modifying group, such as for example maleic anhydride. Examples of elastomers that may be useful for certain applications include SEBS grades FG1924, G1645, and MD6951 from Kraton.

In embodiments, the elastomer content represents 40-60% by weight of the total composition, and the CE content represents 40-60% by weight of the total composition. In embodiments, the composition may optionally contain up to 20% of additives. In embodiments, the additives can be chosen from one or more of the following: process aids, compatibilizers, inorganic fillers, stabilization packages (UV, thermal, or other), adhesion promoters, or other additives to slightly modify the performance for a specific application.

In embodiments, the final hardness of the blend (or composition) may be in the range from 65-95 Shore A. In embodiments, extruded film products made from the composition may be for end use applications chosen from automotive interiors and trim, upholstery for home and office furniture, marine upholstery, breathable films, laminated/multi-layer films, or packaging. In embodiments, the films may be textured, bonded to other film layers or substrates (thermal or with an adhesive), or experience other secondary processing such as coating, laser etching, printing, or thermal treatment.

In certain embodiments, the composition can be used for calendared film applications. In embodiments, the composition can contain from 40-60 wt % elastomer. In certain embodiments for calendared film applications, the composition can contain lower viscosity CE and/or elastomer resins to allow for proper calendaring for a target temperature range. In embodiments, the CE can have a ball drop viscosity less than 20, or less than 15, or less than 10 seconds, as described herein. In embodiments, the composition can comprise a combination of low viscosity and high viscosity CE. In embodiments, the composition can comprise an elastomer with a higher melt flow rate. In embodiments, the elastomer can have a melt flow rate of at least 20 g/10 min, when tested at 220° C. with a 2.16 kg load. In embodiments, composition can have a complex viscosity at or below 50,000 Pa*s, at calendaring temperatures, for example in the range of 180° C. to 220° C.

In embodiments, the composition can comprise a blend that is blended together via a method other than a twin-screw extruder. In embodiments, the composition can be made with elastomers that have increased compatibility with, or otherwise do not require high shear to blend sufficiently with, the CE component. Examples of elastomers that exhibit increased compatibility with the CE component, e.g., CAP, are a maleic-anhydride-grafted SEBS or Kraton MD6951. In embodiments, a separate compatibilizer may also be used, such as for example modified or grafted polymers, other block copolymers, or other commercial compatibilization additives.

In certain embodiments, the composition can be used for fabric-backed upholstery applications, where strain at break and tear strength may be less important than the ability to bond to the fabric or other substrates. In embodiments for such applications, the composition can have a decreased melt viscosity to encourage flow of the resin around the fabric during a lamination process. In embodiments, this could be achieved by selecting a CE or elastomer with a lower viscosity across all temperatures, or a more rapid decrease in viscosity upon heating. In embodiments, the composition can comprise an adhesion promoter to increase bonding to substrates or fabric layers. Examples of some useful adhesion promoters include one or more of the following: silanes/silicones, chlorinated polyolefins, titanates, zirconates, phosphate acids and esters, maleic anhydride modified polymers, epoxy chemistry, or polymers modified to include the adhesion promoting chemistries.

In certain embodiments for applications requiring softer material with more elasticity and lower modulus, the content of elastomer may be in the range of 50-80 wt %, or 60-80 wt %, or 70-80 wt %. In other embodiments, a softer grade of elastomer may be selected and the content may be in the range from 40-80 wt %, or 40-70 wt %, or 40-60 wt %. In certain embodiments, high temperature stability imparted by the cellulose ester may become less for compositions with higher content of elastomers. As such, compositions having the higher content of elastomer may be more suitable for indoor or short-term usage applications.

In embodiments, certain injection molded applications may be sensitive to adhesion in the mold and modulus at higher temperatures that can affect the ease of ejection. In certain embodiments for injection molding applications, the composition may include reinforcing fillers to reduce mold shrinkage and improve ejection performance, fillers or slip additive to adjust surface coefficient of friction, or adhesion promoters to improve over-molding performance.

In certain applications, UV stability and outdoor weathering resistance may be important. In embodiments, the composition can comprise UV stabilization additives. In embodiments, the composition comprises at least one elastomer with good weatherability. Examples of some elastomer having good weatherability include a hydrogenated styrenic block copolymer, instead of an elastomer that contains double bonds, or an aliphatic TPU, instead of an aromatic TPU.

In one embodiment, the elastomer has a neutral acidity. It is believed that this can help prevent the cellulose esters from degrading during the melt processing of the compositions.

In certain embodiments, the composition may contain "a low level" of low molecular weight plasticizer, provided the volatility requirements previously mentioned are still met. In other embodiments, a higher % of low-volatility, higher molecular weight plasticizer may be used such that the volatility requirements previously mentioned are still met.

In embodiments, the composition contains no plasticizer. In embodiments, the composition contains no polyether ester compounds. In embodiments, the composition contains no adipic acid compounds. In embodiments, the composition contains no methylene acceptor or donors. In embodiments, the composition contains no thermosettable resins, i.e., resins that will thermoset (or cross-link) during melt-processing of the composition. In certain embodiments, the composition comprises 20-70 wt % of one or more cellulose esters, 30-80 wt % of one or more elastomers, and less than 10, or less than 5 wt % total of other components, based on the total weight of the composition. In certain embodiments, such other components do not include plasticizers, polyether ester compounds or adipic acid compounds. In certain embodiments, such other components do not include methylene acceptor or donors, or thermosettable resins.

In another embodiment of the invention, the composition is melt processable after blending/compounding. Melt processable refers to the ability to thermally process the materials below their degradation temperature to obtain homogeneous pellets or plastic articles. For example, the compositions described can be melt extruded on a Werner & Pflerderer 30 mm twin screw extruder at a throughput of 25 lbs/hour with screw speed of 250-275 rpm and barrel temperature of 220° C. with minimal molecular weight degradation (e.g., less than 5% decrease in MW from the initial MW) or color degradation (e.g., less than 5% increase in haze or 5% decrease in transmission, based on a scale or 0 to 100%).

In embodiments, the compositions can comprise at least one additive selected from the group comprising antioxidants, thermal stabilizers, mold release agents, antistatic agents, whitening agents, colorants, flow aids, processing aids, plasticizers, anti-fog additives, minerals, UV stabilizers, lubricants, chain extenders, nucleating agents, reinforcing fillers, wood or flour fillers, glass fiber, carbon fiber, flame retardants, dyes, pigments, colorants, additional resins and combinations thereof. In embodiments, the additives present are of a type and/or in an amount such that the volatility requirements discussed herein are met.

The efficiency of mixing two or more viscoelastic materials can depend on the ratio of the viscosities of the viscoelastic materials. In an embodiment, for a given mixing equipment and shear rate range, the viscosity ratio of the dispersed phase and continuous phase should be within specified limits for obtaining adequate particle size or distribution profile. In embodiments, the elastomeric component is the continuous phase and the CE component is the discontinuous phase.

In embodiments, mixing of the elastomers, cellulose esters, and the optional additives can be accomplished by any method known in the art that is adequate to disperse the elastomers, cellulose esters, and additives. Examples of mixing equipment include, but are not limited to, Banbury mixers, Brabender mixers, roll mills, and extruders (single or twin screw). The shear energy during the mixing is dependent on the combination of equipment, blade design, rotation speed (rpm), and mixing time. The shear energy should be sufficient to disperse the elastomers and cellulose esters, e.g., dispersing the cellulose ester throughout the elastomer (where the elastomer is the continuous phase).

In embodiments, the cellulose ester, elastomer, and additives can be combined in any order during the process. In one embodiment, the elastomer is premixed with the cellulose ester, and then mixed with the additives.

This invention can be further illustrated by the following examples of preferred embodiments thereof, although it will be understood that these examples are included merely for purposes of illustration and are not intended to limit the scope of the invention unless otherwise specifically indicated.

EXAMPLES

The properties of films provided in the examples were measured as described below. Unless specified otherwise, properties mentioned and corresponding values provided in the specification were measured as described below. Unless specified otherwise, samples were equilibrated for 40 hrs at 23° C.+/−2° and 50% RH+/−10%, prior to performing tensile, tear and shore A hardness tests.

Glass transition temperature (Tg) was measured according to ASTM Standard Method D3418 using a TA Instruments Q200 DSC, where the sample is heated from −100° C. at a heating rate of 10° C./min. DSC scans of blends of materials may show multiple Tg transitions. The blend may have more than one Tg if it is multi-phase.

Oxygen permeability was measured on extruded films using a Mocon Ox-Tran system per ASTM D3985. Water vapor permeability was measured on extruded films using a Mocon Permatran-W system per ASTM F1249. An impermeable mask may have been utilized to reduce the surface area of highly permeable films.

Tensile modulus was measured in the machine and transverse direction using an MTS load frame according to ASTM D412 method A, die type C. The elongation rate or crosshead speed for the samples was 20 in/min if they were the elastomeric, or 2.0 in/min if they were not elastomeric.

Tear strength was tested according to ASTM D624, Die C at a test speed of 20 in/min for elastomeric samples, and otherwise according to D1938 at a test speed of 10 in/min.

Surface roughness was measured on as-extruded films using a Bruker ContourGT optical profilometer at 5× magnification. Root mean square (RMS) surface roughness was calculated over the entire image area. AFM analysis was performed on a Bruker Dimension Icon AFM, utilizing PeakForce Quantitative NanoMechanics (QNM) mode to acquire height and modulus images. Prior to analysis, samples were mechanically polished with a Leica Cryomicrotome at −40° C.

Parallel plate rheology (or Complex Viscosity) was measured on a TA Instruments ARES-G2. An oscillatory frequency sweep test was run logarithmically from 1 to 400 1/s at an applied strain of 10% at the desired temperature. The data was then fitted using the Cross Model to provide a zero shear viscosity for the material at the desired temperature.

Shore A durometer hardness was measured according to ASTM D2240 using a Rex Gauge Company Shore A, model A-2 durometer using an OS-2 stand.

VOC and FOG values were measured according to VDA 278.

Cold temperature brittleness is testing using the "bent loop" test. A film sample is cut with a 2"×5%" die. The length is cut parallel to the transverse direction of the film. The film is folded length wise and the two ends are stapled evenly to a 2"×5" index card. The staples are set ½" back from the end of the sample. Samples are conditioned at the test temperature for approximately 15 minutes. Samples are then impacted by a hinged hammer and the failure mode (brittle, ductile/no failure) are recorded. The temperature at which 5 out of 10 samples fail in a brittle manner is noted as the transition temperature.

The composition blends can generally be compounded on any melt blending or compounding equipment known by those skilled in the art to provide sufficient dispersion of polymer blends. Unless specifically described otherwise, the sample blends in the examples below were compounded on a Werner Plfeiderer 30 mm (24:1 L/D ratio) twin screw extruder at a throughput of 25 lbs/hour with screw speed ranging from 250 to 275 rpm (depending on blend) and a barrel temperature of 220° C. Evaluation films were extruded on a 1.5" Killion single screw extruder at 60 rpm and a barrel temperature of 220° C. Film thickness varied from about 15 to 20 mils. A standard sheet die was used. Samples were dried at 65° C. for 12 hours prior to extruding the films.

Example 1—SEBS/CAP Blend Films Vs. PVC and TPU Films

Textured films were produced from a composition containing a blend of SEBS elastomer and CAP resin as follows: a 1:1 ratio by weight of Kraton FG1924 (a maleic anhydride-grafted SEBS) and CAP 482-20 (from Eastman Chemical Company) was compounded on a twin-screw extruder and subsequently extruded into a textured film. Properties of the film were measured and compared to samples of commercially available PVC and TPU films. The film properties are shown below in Table 2.

TABLE 2

Property Summary of CAP/SEBS Film vs. PVC and TPU films

| Property | CAP/SEBS | PVC | TPU |
|---|---|---|---|
| Density (g/cc) | 1.035 | 1.22 | 1.11 |
| O2 Permeability (cc*mil/(m2*24 h) | 48074 | 17782 | 7720 |
| Water Permeability (g*mil/(m2*24 h)) | 423 | 79 | 811 |
| Young's Modulus (D412, MPa) (MD/TD) | 77.3 | 44.0/43.1 | 25.5/26.6 |
| Stress at 100% Strain (D412, MPa) (MD/TD) | 7.01 | 11.0/10.3 | 6.2/6.0 |
| Tensile Strength (D412, MPa) (MD/TD) | 5.8 | 19.4/18.3 | 49.7/46.9 |
| Strain at Break (D412, %) (MD/TD) | 127 | 280/278 | 677/713 |
| Hardness (Shore A) | 74 | 84 | 83 |
| Tg (° C.) | −61/141 | −18 | −35 |
| Die C, Tear Strength (D624, N/mm) (MD/TD) | 30.3/44.0 | 77.9/78.9 | 76.8/77.3 |
| Die C, Tear Energy (D624, N*mm) (MD/TD) | 322/626 | 860/862 | 1496.0/1363.6 |
| Trouser, Avg. Tear Prop. Resist. (D1938, gf/mm) (MD/TD) | 655/1560 | 1948/1978 | 2427/2418 |
| Trouser, Total Energy (D1938, kg*mm) (MD/TD) | 36.5/165 | 108/115 | 128/136 |
| TGA (isothermal hold at 220° C./200° C. for PVC) | .09% (low) | 1.6% (high) | 0.14% (low) |
| VOC (VDA 278, ppm) | 241 | 1125 | 654 |
| Fog (VDA 278, ppm) | 505 | 2674 | 530 |

A review of table 2 reveals that films made with the SEBS/CAP blend have a lower density (i.e., a possible cost and/or weight improvement), higher oxygen permeability, higher modulus, lower hardness, and lower volatile organic content compared to both the PVC and TPU films. Moisture permeability was also higher compared to the PVC sample. Additionally, the SEBS/GAP blend films had lower elongation at break and tear strength compared to the PVC and TPU films, which may be beneficial in applications that require a precise tear feature.

Example 2—CAP and Various Elastomer Blend Films

To further study the impact of elastomer rheology and grade selection, additional grades of elastomer (listed below in Table 3) with different viscosities and functionalization were blended with CAP 482-20 at the ratios provided in Table 4. The blends were compounded using a twin-screw extruder and properties were measured on extruded films approximately 15-19 mil in thickness.

TABLE 3

Summary of Elastomers

| Material | Type | Hardness (Shore A) | MFR |
|---|---|---|---|
| Kraton FG1924 GT | ma-g-SEBS | 49 | 40 (230° C., 5 kg) |
| Kraton G1645 | SEBS | 35 | 2-4.5 (230° C., 2.16 kg) |
| Kraton MD6951 | SEBS | 45 | 48 (230° C., 2.16 kg) |
| Engage 7467 | POE | 52 | 1.2 (190° C., 2.16 kg) |

TABLE 4

Summary of Elastomer/CAP Blends

| Sample Name | CAP 482-20 wt % | FG1924 wt % | G1645 wt % | MD6951 wt % | Engage 7467 wt % |
|---|---|---|---|---|---|
| EX4097-10-02 | 57.5 | 42.5 | 0 | 0 | 0 |
| EX4097-10-03 | 76 | 0 | 24 | 0 | 0 |

TABLE 4-continued

Summary of Elastomer/CAP Blends

| Sample Name | CAP 482-20 wt % | FG1924 wt % | G1645 wt % | MD6951 wt % | Engage 7467 wt % |
|---|---|---|---|---|---|
| EX4097-10-04 | 57.5 | 0 | 42.5 | 0 | 0 |
| EX4097-10-05 | 57.5 | 4.25 | 38.25 | 0 | 0 |
| EX4097-10-11 | 76 | 0 | 0 | 24 | 0 |
| EX4097-10-12 | 57.5 | 0 | 0 | 42.5 | 0 |
| EX4097-10-13 | 58 | 0 | 21 | 0 | 21 |
| EX4097-10-15 | 50 | 50 | 0 | 0 | 0 |

The properties of the blends from table 4 are provided below in Table 5.

viscosity compared to the other blends. This lower viscosity may be beneficial in certain calendared film applications.

TABLE 5

Summary of Properties for Elastomer/CAP Blends

| Properties | EX4097-10-02 | EX4097-10-03 | EX4097-10-04 | EX4097-10-05 | EX4097-10-11 | EX4097-10-12 | EX4097-10-13 | EX4097-10-15 |
|---|---|---|---|---|---|---|---|---|
| O2 Permeability (cc*mil/(m2*24 h) | 37093 | | 59550 | 63188 | | 39356 | | 70890 |
| Water Permeability (g*mil/(m2*24 h)) | 450 | | 392 | 352 | | 529 | | 370 |
| Young's Modulus (D412, MPa) (MD/TD) | 314/50 | 1192/544 | 572/113 | 537/50 | 474/171 | 116/57 | 951/349 | 81/48 |
| Stress at 100% Strain (D412, MPa) (MD/TD) | —/5.0 | —/— | —/— | —/4.9 | —/— | —/2.9 | —/— | 7.8/4.7 |
| Tensile Strength (D412, MPa) (MD/TD) | 17.0/4.5 | 32.9/13.6 | 21.7/6.0 | 21.3/4.9 | 14.7/5.1 | 6.1/4.4 | 27.6/10.0 | 5.2/4.3 |
| Strain at Break (D412, %) (MD/TD) | 82/131 | 46/9 | 53/44 | 56/108 | 38/8 | 84/382 | 61/15 | 182/247 |
| Hardness (Shore A) | 83 | 89 | 84 | 83 | 90 | 82 | 88 | 77 |
| Surface Roughness (RMS um) | 2.05 | | 4.95 | 3.29 | | 2.07 | | 1.23 |
| Tg (° C.) | −61/140 | −48/141 | −46/141 | −47/140 | −36/140 | 35/140 | | −61/140 |
| Die C, Tear Strength (D624, N/mm) (MD/TD) | 25.2/59.3 | 63.9/165.6 | 35.3/83.3 | 25.9/75.7 | 24.4/78.4 | 22.7/33.9 | 48.4/121.4 | 35.9/47.1 |
| Die C, Tear Energy (D624, N*mm) (MD/TD) | 37.1/71.7 | 13.2/101.8 | 34.7/71.1 | 40.3/64.1 | 5.2/39.6 | 45.7/63.9 | 21.0/94.1 | 232.4/297.6 |
| Trouser, Avg. Tear Prop. Resist. (D1938, gf/mm) (MD/TD) | 258/953 | */628 | 323/571 | 530/1254 | 73/212 | 368/759 | 300/782 | 1264/3059 |
| Trouser, Total Energy (D1938, kg*mm) (MD/TD) | 5.8/22.9 | */6.4 | 7.3/4.5 | 11.4/29.7 | 1.3/0.8 | 8.4/20.7 | 7.0/5.3 | 30.9/214.8 |

*did not measure due to instrument error

A review of Table 5 reveals that blends containing maleic anhydride-grafted elastomers exhibited a lower Tg, and increasing the CE content to ~57% by weight resulted in significantly lower tear resistance and increased hardness, at or above the hardness measured for PVC and TPU. This suggests that tear strength and hardness are strongly influenced by CE content and can be selectable by adjusting the elastomer to CE ratio.

Complex viscosity was measured as described above. The rheology of the SEBS/CAP blends were studied at various temperatures and compared to each other (i.e., the different blends) and to commercially available PVC and TPU elastomers. Complex viscosity as a function of frequency was determined for the SEBS/CAP blend (made according to Example 1) at a temperature of 200° C. and compared to PVC at 180° C. and TPU at 200° C. The results are shown in FIG. 1.

Figure 1:
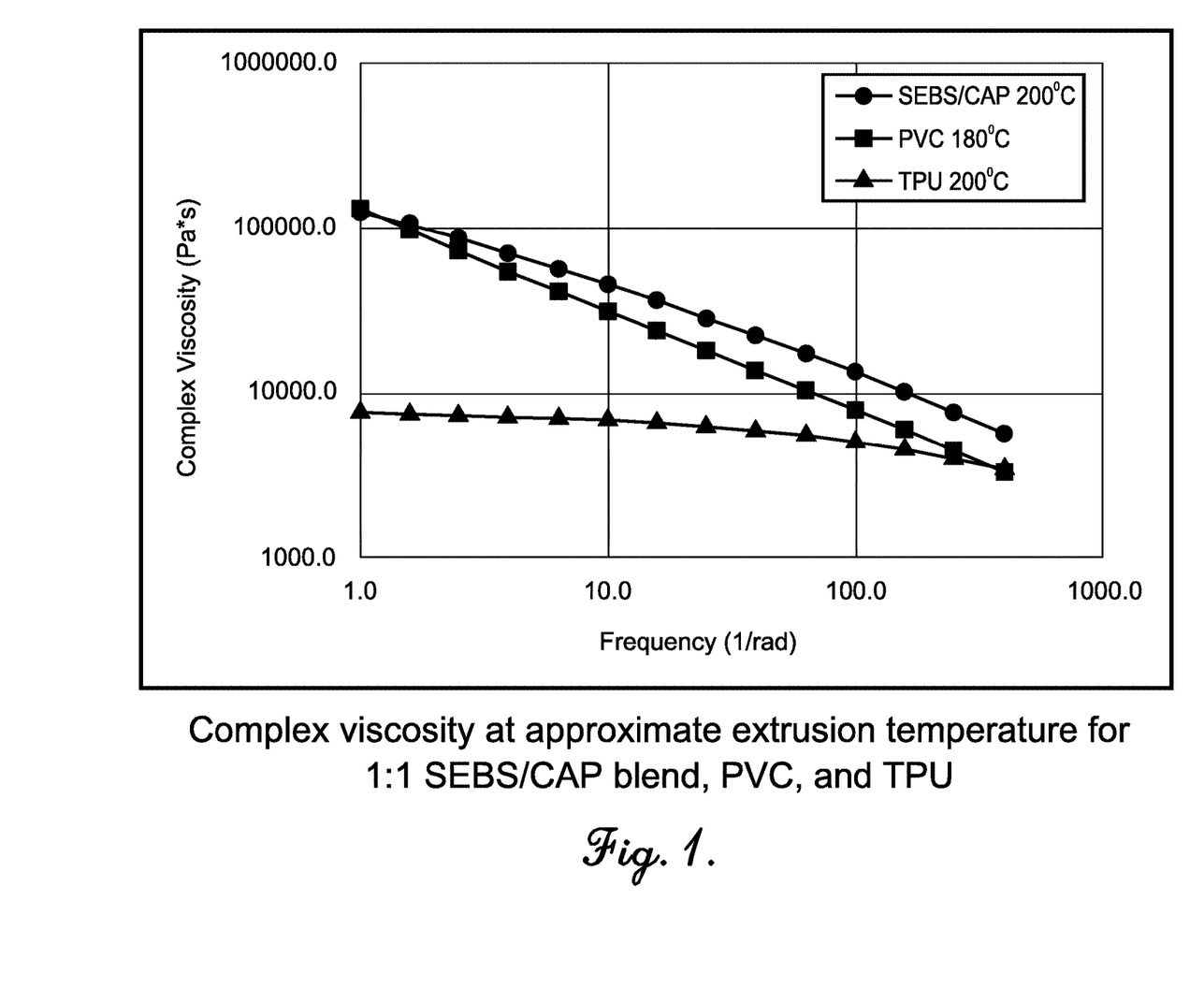
FIG. 1 is a graph of complex viscosity as a function of frequency for an SEBS/CAP blend compared to PVC and TPU films.

A review of FIG. 1 reveals that that processing of the CAP/SEBS blends appear to be relatively similar to the PVC tested and thus suitable for extrusion. Also, the CAP/SEBS blend has higher low-shear melt viscosity compared to the TPU, which may be beneficial for certain applications during film extrusion.

Complex viscosity as a function of frequency was determined for different SEBS/CAP blends at a temperature of 220° C. and compared to each other. The results are shown in FIG. 2.

Complex viscosity as a function of frequency was determined for different SEBS/CAP blends at a temperature of 220° C. and compared to their respective individual components. The results are shown in FIGS. 3(a-c).

Figure 2:
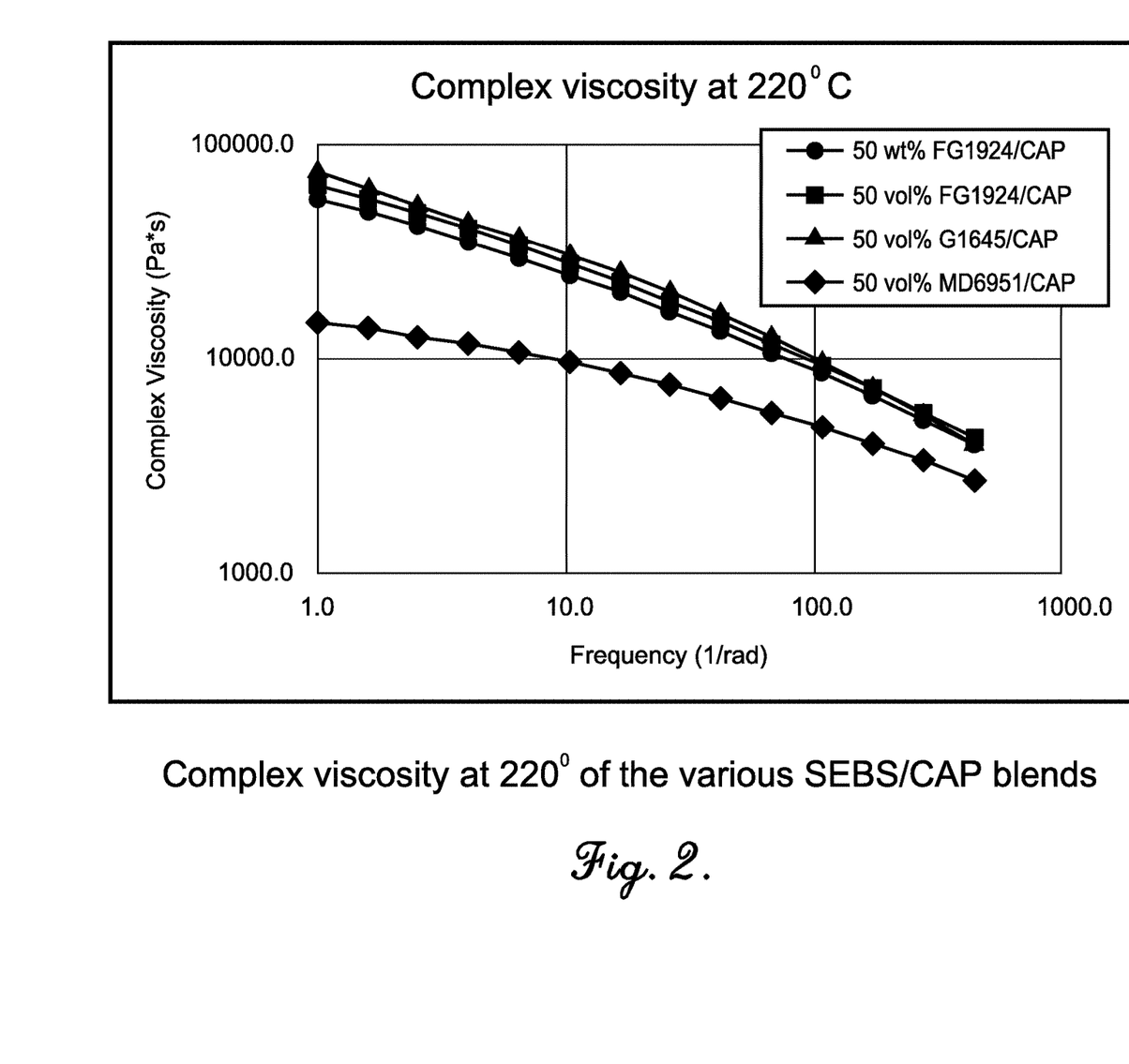
FIG. 2 is a graph of complex viscosity as a function of frequency for various elastomer/CAP blends.
Figure 3A:
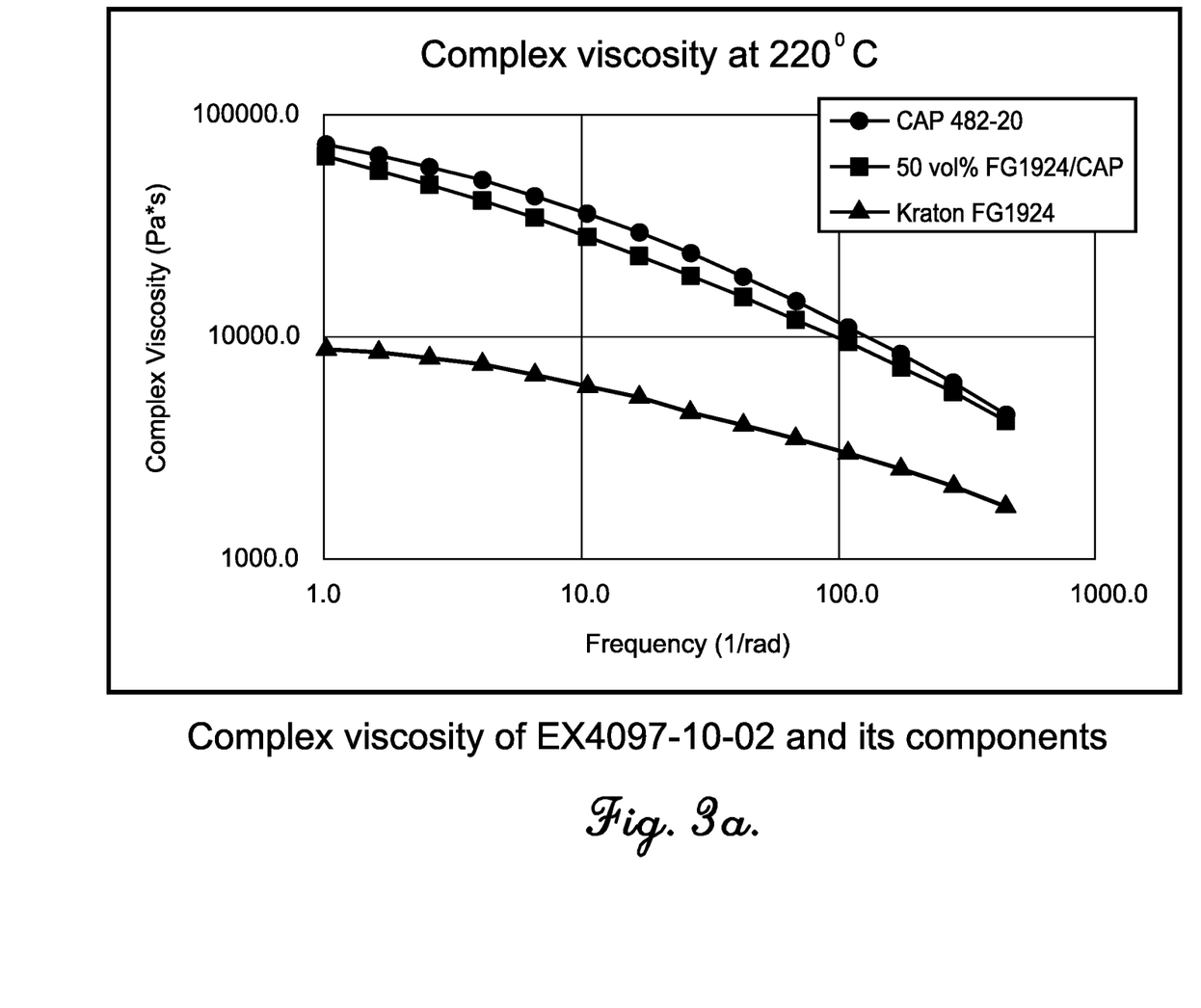
Figure 3B:
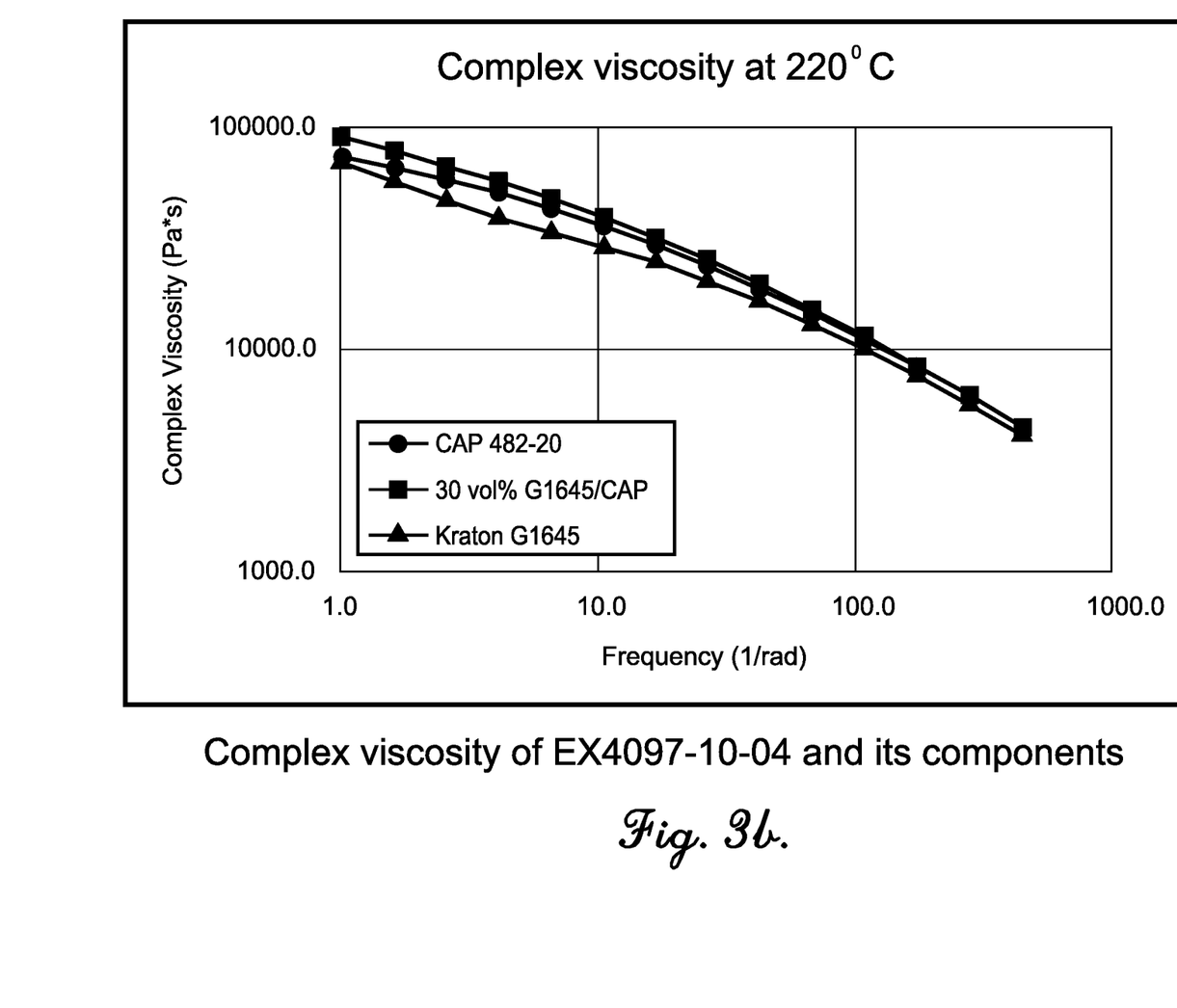
Figure 3C:
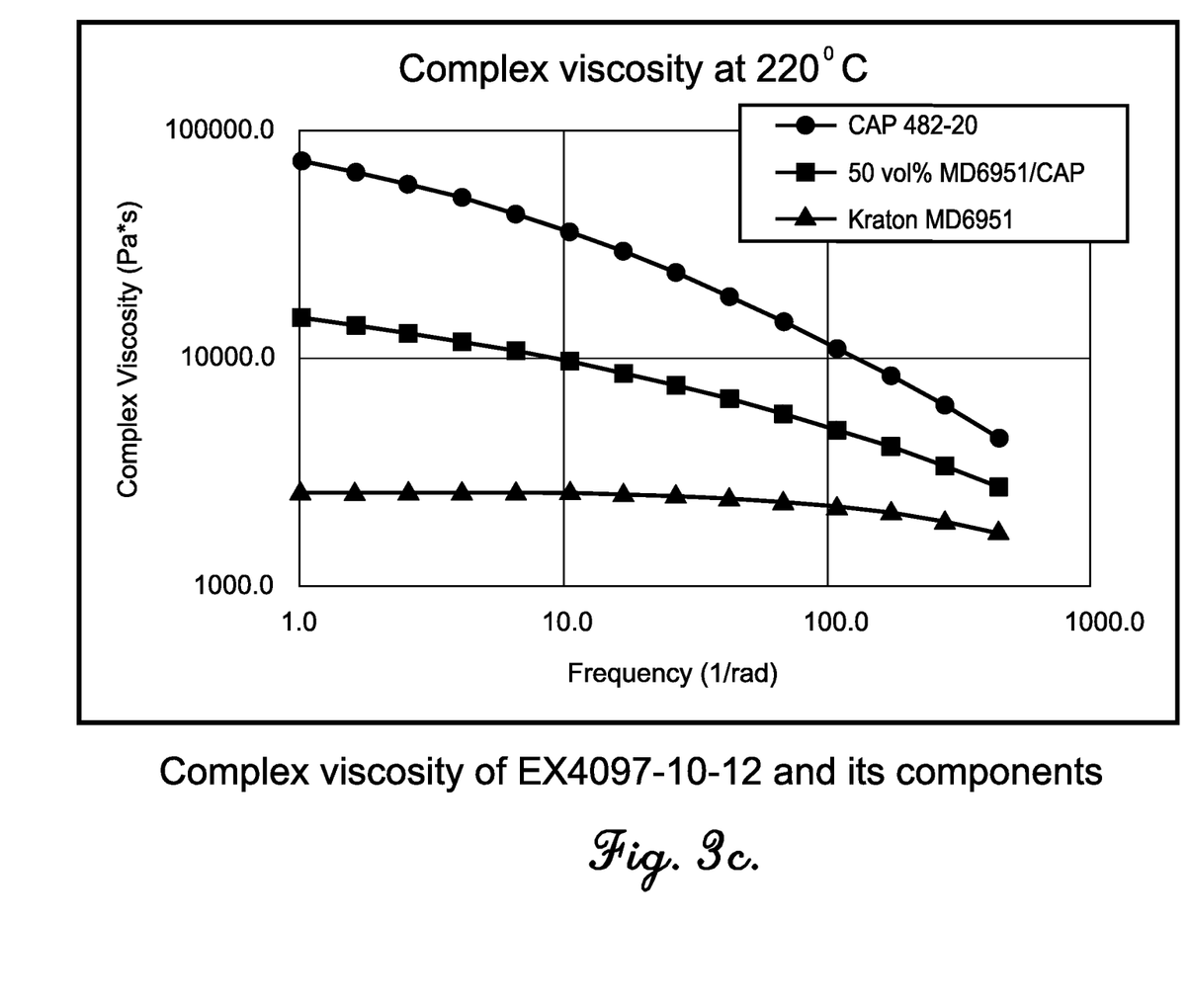
Figure 4A:
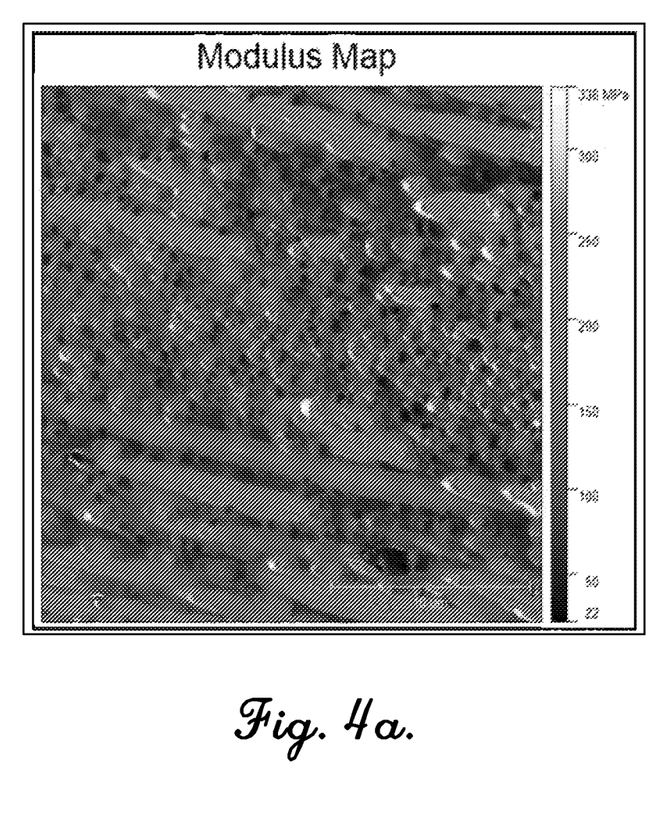
Figure 4B:
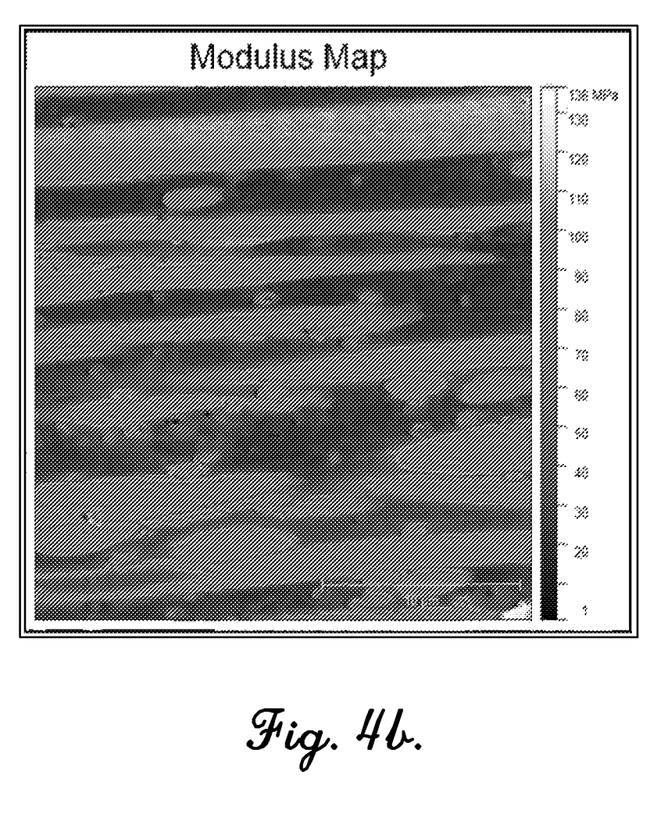
Figure 4C:
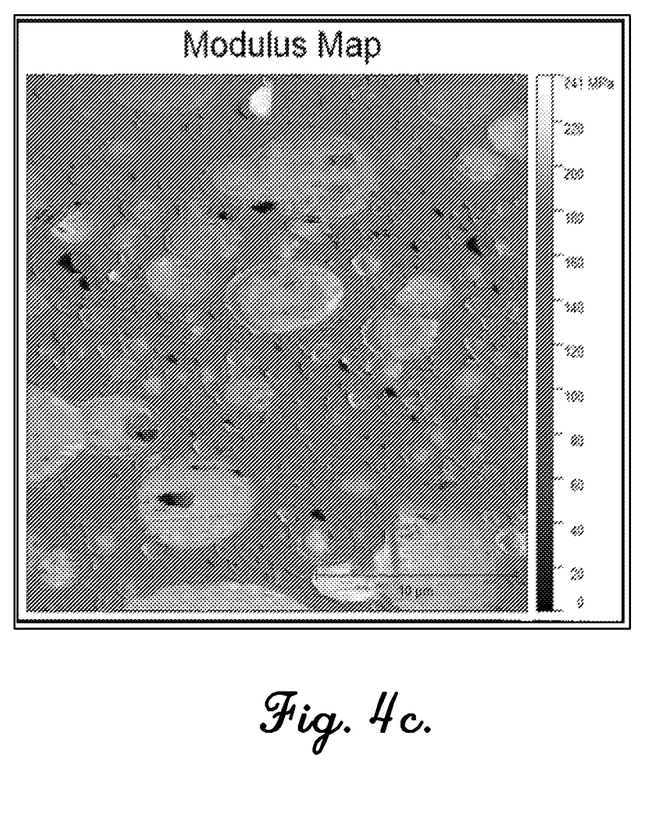

A review of FIGS. 2 and 3 reveals that the maleic anhydride-grafted SEBS (FG1924) had a different viscosity response compared to the unmodified SEBS (G1645). The addition of 42.5% by weight of the maleic-anhydride modified SEBS does not result in a viscosity reduction compared to the CAP polymer. Also, the addition of the unmodified low viscosity SEBS (MD6951) does result in a reduction in Atomic Force Microscopy (AFM) was used to examine the morphology of different SEBS/CAP blends. The micrographs are shown in FIGS. 4 (a-c). A review of these figures reveals that based on domain size alone, the ma-g-SEBS appears to be the most compatible and dispersed with the CAP. The standard SEBS appears to be poorly dispersed with the CAP despite being viscosity matched. The addition of 42.5% by weight Kraton MD6951 exhibits better dispersion with the CAP than the standard unmodified SEBS.

The above detailed description of embodiments of the disclosure is intended to describe various aspects of the invention in sufficient detail to enable those skilled in the art to practice the invention. Other embodiments can be utilized and changes can be made without departing from the scope of the invention. The above detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

That which is claimed is:

1. A composition comprising a blend of a cellulose ester component that comprises at least one cellulose ester chosen from cellulose propionate (CP), cellulose butyrate (CB), cellulose acetate propionate (CAP), cellulose acetate butyrate (CAB), cellulose propionate butyrate (CPB), cellulose tripropionate (CTP), cellulose tributyrate (CTB), or a combination thereof, wherein the at least one cellulose ester has a relative viscosity ($\eta_{rel}$) of greater than 6.0 to 9.0, measured at a temperature of 25° C. for a 2 wt % solution of the at least one cellulose ester in acetone according to ASTM D4603; and an elastomeric component that comprises at least one elastomer chosen from polyether block amides (PEBA), ethylene-vinyl acetate (EVA), styrenic block copolymer elastomers, thermoplastic polyolefin elastomers (TPO), thermoplastic vulcanizates (TPV), thermoplastic polyurethanes (TPU), thermoplastic copolyester elastomers (TPC), other thermoplastic polyamide elastomers (TPA), or a combination thereof, wherein the cellulose ester component is present in an amount from 40 to 60 weight percent and the elastomeric component is present in an amount from 40 to 60 weight percent, based on the total amount of composition, and wherein the composition is thermoplastic, has a hardness in the range from 65 to 95 Shore A, and has a volatile content of 2 wt % or less measured according to the VDA 278 test method.

2. The composition according to claim 1, wherein the composition is thermoplastic and melt-processable over a temperature range from about 175° C. up to the degradation temperature.

3. The composition according to claim 1, wherein the composition is multi-phased.

4. The composition according to claim 3, wherein the elastomeric component is a continuous phase and the cellulose ester component is a dispersed phase.

5. The composition according to claim 1, wherein the elastomeric component and cellulose ester component are miscible.

6. The composition according to claim 1, wherein the cellulose ester component comprises of a blend of two or more of the different cellulose esters.

7. The composition according to claim 1, wherein the elastomeric component comprises an elastomer that is chemically modified.

8. The composition according to claim 7, wherein the elastomer is chosen from maleic anhydride-grafted elastomers, acrylic copolymers, block copolymers, or combinations thereof.

9. The composition according to claim 1, wherein the elastomeric component comprises a combination of non-functionalized and functionalized elastomers.

10. The composition according to claim 1, wherein the elastomeric component is an SEBS elastomer, a maleic anhydride modified SEBS elastomer, or a combination thereof.

11. The composition according to claim 10, wherein the cellulose ester is CAP.

12. A film or sheet comprising a composition according to claim 1.

13. A method of making the composition of claim 1, comprising combining the elastomeric component and the cellulose ester component and mixing with sufficient energy to provide a stable dispersion.

14. An article comprising a composition according to claim 1, wherein said article is chosen from a vehicle interior component, an upholstery fabric, or a soft-feel covering.

15. The composition according to claim 1, wherein the composition has a hardness in the range from 70 to 90 Shore A (measured as described in the specification).

16. A composition comprising a blend of a cellulose ester component that comprises at least one cellulose ester chosen from cellulose propionate (CP), cellulose butyrate (CB), cellulose acetate propionate (CAP), cellulose acetate butyrate (CAB), cellulose propionate butyrate (CPB), cellulose tripropionate (CTP), cellulose tributyrate (CTB), or a combination thereof, wherein the cellulose esters have a relative viscosity ($\eta_{rel}$) of greater than 6.0 to 9.0, measured at a temperature of 25° C. for a 2 wt % solution of the cellulose ester in acetone according to ASTM D4603; and an elastomeric component that comprises at least one elastomer, wherein the elastomeric component is present in an amount from 40 to 60 weight percent, based on the total composition, wherein the elastomeric component and cellulose ester component are miscible, and wherein the composition is thermoplastic, has a hardness in the range from 65 to 95 Shore A (measured as described in the specification), and has a volatile content of 2 wt % or less measured according to the VDA 278 test method.

17. The composition according to claim 16, wherein the elastomer is a TPU.

18. The composition according to claim 17, wherein the composition has a volatile content of 1 wt % or less, measured according to the VDA 278 test method.

* * * * *